(12) United States Patent
Herrera Mejia et al.

(10) Patent No.: US 9,223,365 B2
(45) Date of Patent: Dec. 29, 2015

(54) METHOD AND APPARATUS FOR CONTROLLED RESET SEQUENCES WITHOUT PARALLEL FUSES AND PLL'S

(71) Applicant: Intel Corporation, Santa Clara, CA (US)

(72) Inventors: Ivan Herrera Mejia, Folsom, CA (US); Vishram Sarurkar, Folsom, CA (US); Vijay K. Vuppaladadium, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 331 days.

(21) Appl. No.: 13/844,824

(22) Filed: Mar. 16, 2013

(65) Prior Publication Data

US 2014/0281641 A1    Sep. 18, 2014

(51) Int. Cl.
*G06F 1/24* (2006.01)
*G06F 1/30* (2006.01)
*G06F 1/32* (2006.01)

(52) U.S. Cl.
CPC ............. *G06F 1/24* (2013.01); *G06F 1/305* (2013.01); *G06F 1/3212* (2013.01)

(58) Field of Classification Search
CPC ........................................................ G06F 1/24
See application file for complete search history.

(56) References Cited

U.S. PATENT DOCUMENTS

| | | | |
|---|---|---|---|
| 4,641,044 A | 2/1987 | Shiraishi | |
| 4,689,496 A | 8/1987 | Kerber et al. | |
| 4,992,951 A | 2/1991 | Glowczewski et al. | |
| 5,261,076 A | 11/1993 | Shamshirian | |
| 5,377,205 A | 12/1994 | Shi | |
| 5,386,152 A | 1/1995 | Naraki | |
| 5,446,403 A | 8/1995 | Witkowski | |
| 5,510,741 A | 4/1996 | Childs | |
| 5,513,358 A * | 4/1996 | Lundberg et al. | 713/330 |
| 5,696,950 A | 12/1997 | Ichinose et al. | |
| 5,717,907 A | 2/1998 | Kuddes et al. | |
| 5,794,022 A | 8/1998 | Karouji | |
| 5,815,043 A * | 9/1998 | Chow et al. | 331/57 |
| 5,860,125 A | 1/1999 | Reents | |
| 5,864,572 A | 1/1999 | Bhagwan | |
| 5,941,915 A | 8/1999 | Federle et al. | |
| 6,085,327 A | 7/2000 | Seng et al. | |
| 6,236,253 B1 | 5/2001 | Leasure et al. | |
| 6,891,417 B2 | 5/2005 | Khondker et al. | |
| 7,019,568 B2 | 3/2006 | Olsen | |
| 7,127,631 B2 | 10/2006 | D'Angelo et al. | |
| 7,231,539 B1 | 6/2007 | Leet | |
| 7,250,821 B2 * | 7/2007 | Momii et al. | 331/1 A |
| 7,290,128 B2 | 10/2007 | Habib | |
| 7,496,803 B2 | 2/2009 | Khondker et al. | |
| 7,667,489 B1 | 2/2010 | Vasudevan | |
| 7,668,948 B2 | 2/2010 | Prasad et al. | |
| 7,696,801 B2 | 4/2010 | Yeh et al. | |
| 7,705,659 B1 | 4/2010 | Liu | |
| 8,112,265 B2 | 2/2012 | Joshi et al. | |
| 8,122,270 B2 | 2/2012 | Allarey et al. | |

(Continued)

*Primary Examiner* — Suresh Suryawanshi
(74) *Attorney, Agent, or Firm* — Trop, Pruner & Hu, P.C.

(57) ABSTRACT

A system, semiconductor device and method for providing a controlled system reset sequence with lower power consumption without dependency on fuses, PLL's and external XTAL's. A method to simplify a boot sequence by using a ring oscillator that compensates for voltage and temperature variations while also removing the dependency on parallel fuses, PLL's and external XTAL's.

19 Claims, 8 Drawing Sheets

(56) References Cited

U.S. PATENT DOCUMENTS

| | | |
|---|---|---|
| 8,433,962 B2 | 4/2013 | Whetsel |
| 2002/0133190 A1 | 6/2002 | Groo |
| 2003/0020524 A1 | 1/2003 | Ehmann |
| 2004/0049707 A1 | 3/2004 | Hartwell |
| 2004/0090830 A1 | 5/2004 | Lee et al. |
| 2004/0113675 A1 | 6/2004 | Joo |
| 2005/0110522 A1 | 5/2005 | Hoekstra |
| 2005/0179476 A1 | 8/2005 | Sweet |
| 2006/0248395 A1 | 11/2006 | McGowan |
| 2007/0014176 A1 | 1/2007 | Krenzke et al. |
| 2007/0086263 A1 | 4/2007 | Fenstermaker |
| 2010/0061161 A1 | 3/2010 | Jung et al. |
| 2010/0090730 A1 | 4/2010 | Wu |
| 2010/0238756 A1 | 9/2010 | Jung et al. |
| 2010/0318884 A1 | 12/2010 | Oliver et al. |
| 2011/0018613 A1 | 1/2011 | Wang |
| 2011/0320852 A1 | 12/2011 | Tsai |
| 2012/0159138 A1 | 6/2012 | Tsirkin et al. |
| 2013/0002316 A1 | 1/2013 | Goh et al. |
| 2013/0169255 A1 | 7/2013 | Daigle et al. |

* cited by examiner

METHOD AND APPARATUS FOR CONTROLLED RESET SEQUENCES WITHOUT PARALLEL FUSES AND PLL'S

TECHNICAL FIELD

Embodiments described herein generally relate to microprocessor-based systems and, in particular, of providing reliable reset operation with lower power consumption.

BACKGROUND

In current computer systems, reset operation relies on fuses, PLL's and external XTAL's that tend to cause voltage and temperature variations in a system. It would be beneficial to remove dependency on fuses, PLL's and external XTAL's to guarantee reliable system boot operation with lower power consumption.

DESCRIPTION OF EMBODIMENTS

In at least one embodiment, method for a power on sequence, includes initiating a ring oscillator responsive to receiving a power up signal from a power management IC; generating a calibrated ring oscillator signal by calibrating a frequency of a ring oscillator signal with a reference clock signal; and responsive to detecting a calibrated ring oscillator signal error below a predetermined threshold value: providing the calibrated ring oscillator signal to a firmware module to execute firmware.

In some embodiments: the reference clock is the only clock source; the reference clock frequency is in the range of 10 to 50 kHz; a frequency of the calibrated ring oscillator is in the range of 5 to 500 MHz; a jitter of the calibrated ring oscillator signal is less than a jitter threshold, the jitter threshold may be in the range of approximately 5 to 10%; a skew of the calibrated ring oscillator signal may be less than a skew threshold, wherein the skew threshold is in the range of approximately 5 to 10%.

Some embodiments include: establishing a first phase locked loop (PLL) after executing the firmware; calibrating may initiate responsive to receiving an assert power good signal from the power management IC. Some embodiments include correcting ring oscillator signal jitter and skew at a targeted frequency. In some embodiments; calibrating includes counting a number of ring oscillator signals during a calibration interval determined by the reference clock signal.

In some embodiments, a computer system includes an external reference clock; a power management IC; and a system-on-chip, comprising a processor; a fuse controller; and a power management unit. The power management unit may include a ring oscillator; an internally generated clock; and a power management controller to: initiate a ring oscillator responsive to receiving a power up signal from a power management IC; generate a calibrated ring oscillator signal by calibrating a frequency of a ring oscillator signal with a reference clock signal; responsive to detecting a calibrated ring oscillator signal error below a predetermined threshold value: provide the calibrated ring oscillator signal to a firmware module to execute firmware. In some embodiments, the reference clock is the only clock source wherein the reference clock frequency is in the range of 10 to 50 kHz. A frequency of the calibrated ring oscillator may be in the range of 5 to 500 MHz. In some embodiments, establishing a first phase locked loop (PLL) after executing the firmware and calibrating initiates responsive to receiving an assert power good signal from the power management IC.

In some embodiments, a system-on-chip includes a processor; a fuse controller; and a power management unit, comprising; a ring oscillator; an internally generated clock; and a power management controller to: initiate a ring oscillator responsive to receiving a power up signal from a power management IC; generate a calibrated ring oscillator signal by calibrating a frequency of a ring oscillator signal with a reference clock signal; responsive to detecting a calibrated ring oscillator signal error below a predetermined threshold value: provide the calibrated ring oscillator signal to a firmware module to execute firmware. The reference clock frequency is in the range of 10 to 50 kHz; a frequency of the calibrated ring oscillator is in the range of 5 to 500 MHz; wherein calibrating initiates responsive to receiving an assert power good signal from the power management IC.

In the following description, details are set forth in conjunction with embodiments to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, widget 12-1 refers to an instance of a widget class, which may be referred to collectively as widgets 12 and any one of which may be referred to generically as a widget 12.

Figure 1:
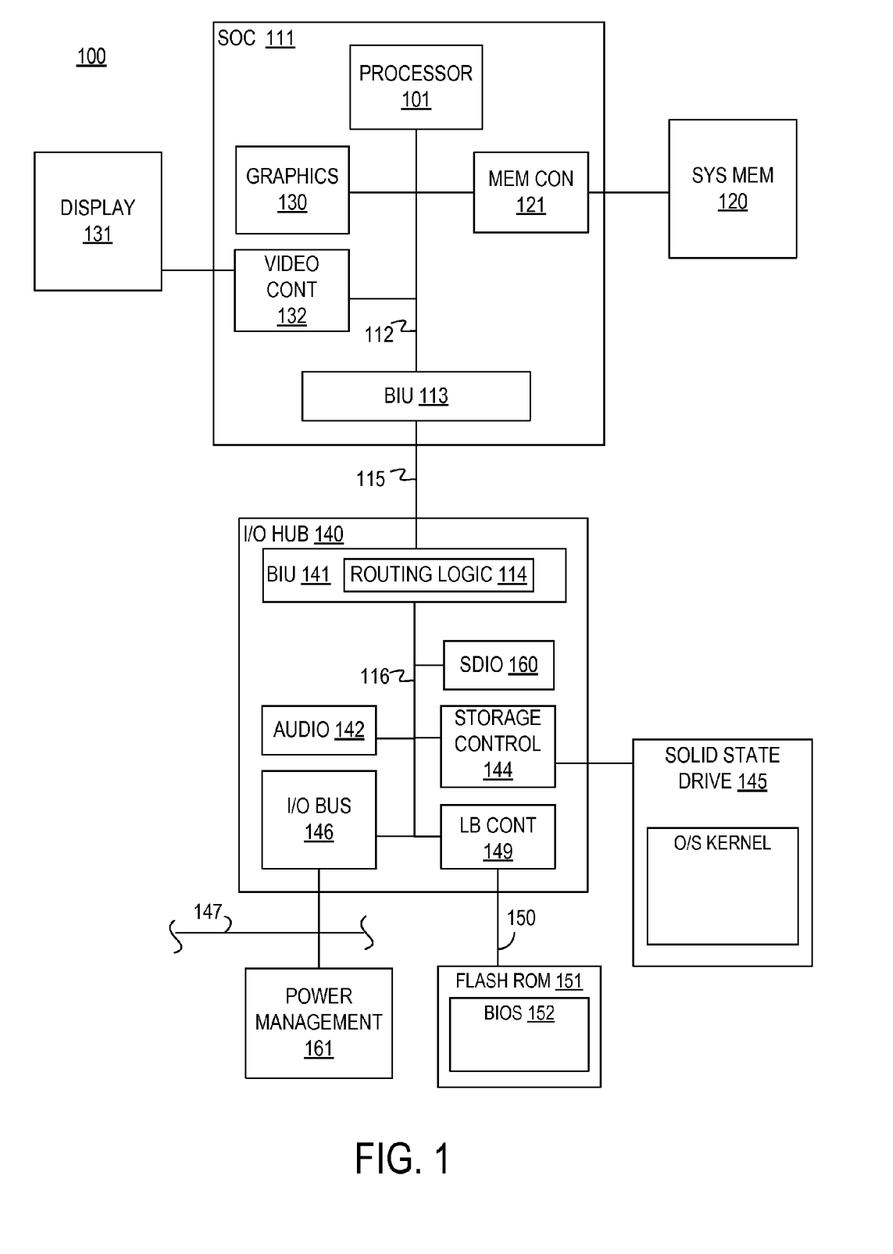
FIG. 1 illustrates a system-on-chip platform used in conjunction with at least one embodiment.

Referring to FIG. 1, an embodiment of a microprocessor based system 100 is illustrated. In the illustrated embodiment, system 100 includes an SoC 111, an I/O hub 140, and an interconnect 115 that connects SoC 111 and I/O hub 140. In the illustrated embodiment, SoC 111 includes a processor 101, an integrated memory controller 121 connected to an internal interconnect 112 to provide access to system memory 120. The illustrated embodiment further includes an integrated graphics adapter 130 and video controller 132 connected to interconnect 112 to control a display 131. A bus interface unit 113 provides an interface between interconnects 112 and 115.

The illustrated embodiment of I/O hub 140 includes an audio adapter 142, a storage controller 144, an I/O bus controller 146 to support a peripheral bus 147, and a low bandwidth or legacy bus (LB) controller 149 to provide access to a flash read-only memory (ROM) 151 or other form of persistent storage via an LB bus 150. In the illustrated embodiment, flash ROM 151 includes BIOS 152. In at least one embodiment, storage controller 144 controls a solid state drive 145, which may be a NAND flash drive, or other form of mass nonvolatile storage. In at least one embodiment, LB bus 150 is a serial peripheral interface (SPI) bus and peripheral bus 147 is a universal serial bus (USB).

The illustrated embodiment of I/O hub 140 includes a secure digital I/O (SDIO) chip 160 connected to I/O hub 140. In the illustrated embodiment, SDIO chip 160 provides support for various wireless communication protocols including, in at least one embodiment, Wi-Fi. Embodiments of I/O hub 140 may include one or more interfaces that may support WiFi and/or wireless telephony protocols. Other embodiments of I/O hub may integrate RF hardware within I/O hub 140 or SoC 111 using RF-CMOS (complementary metal oxide semiconductor) fabrication technology.

In the embodiment illustrated in FIG. 1, I/O hub 140 includes a bus interface unit 141 that provides an interface between interconnect 115 and an interconnect 116, internal to I/O hub 140, to which audio adapter 142, storage controller 144, I/O bus controller 146, and LB controller 149 are connected.

In at least one embodiment, system 100 includes routing logic 114 that monitors physical interconnects 113, 115, and 116.

The illustrated embodiment of computer system 100 further includes a dedicated power management unit 161, which may connect to I/O hub 140 through USB or another form of interconnect. In other embodiments, power management unit 161 may be integrated within I/O hub 140 or SoC 111. Some embodiments may include power management resources for I/O hub 140 as well as SoC 111.

Figure 2:
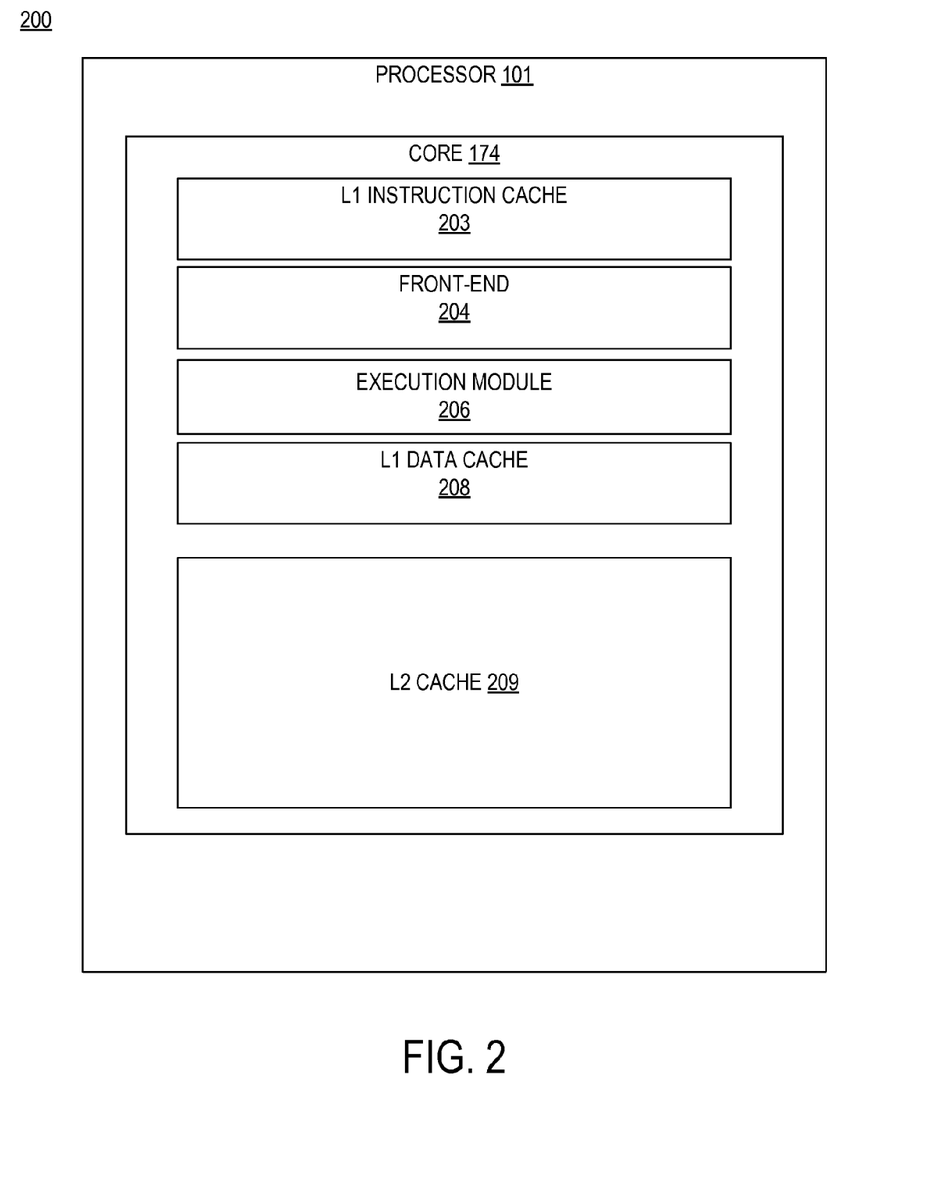
FIG. 2 illustrates a processor used in conjunction with at least one embodiment.

Referring now to FIG. 2, one embodiment of processor 101 is illustrated. In illustrated embodiment 200, a processing core 174 of processor 101 includes a level 1 (L1) instruction cache 203, a front-end 204, an execution module 206, an L1 data cache 208, and a level 2 (L2) cache 209. Although FIG. 2 illustrates an embodiment having a single core 174, other embodiments may include two or more processing cores. Similarly, other embodiments of processor 101 may include one or more additional cache memory elements, including, an L3 cache memory L3 that is shared among each processing core in multicore embodiments.

In at least one embodiment, front-end 204 monitors and maintains an instruction pointer and fetches instructions for execution from L1 instruction cache 203. Front-end 204 may also perform all or some decoding of instructions fetched from L1 instruction cache 203 before scheduling and issuing instructions for execution in execution module 206. In at least one embodiment, execution module 206 includes one or more pipelined integer arithmetic logic units, load/store units, floating point pipelines, and branch units. Execution module 206 may include a register file that the pipeline accesses to provide operands and store results of arithmetic, floating-point, and logical operations. Load store instructions executed within execution module 206 may access L1 data cache 208 to obtain data for a read or load or to store data in the L1 data cache 208. Although the embodiment of processor 101 illustrated in FIG. 2 is a single core processor, other embodiments may include two, four, or some other number of cores. Similarly, although the illustrated embodiment of processor 101 includes an L1 instruction cache, an L1 data cache, and an L2 cache, other embodiments of processor 101 may include more or fewer cache elements. Embodiments of processor 101 may include a level 3 (L3) cache and, in embodiments that include multiple processing cores 174, the L3 cache may be a shared cache that is shared among the two or more processing cores.

Figure 3:
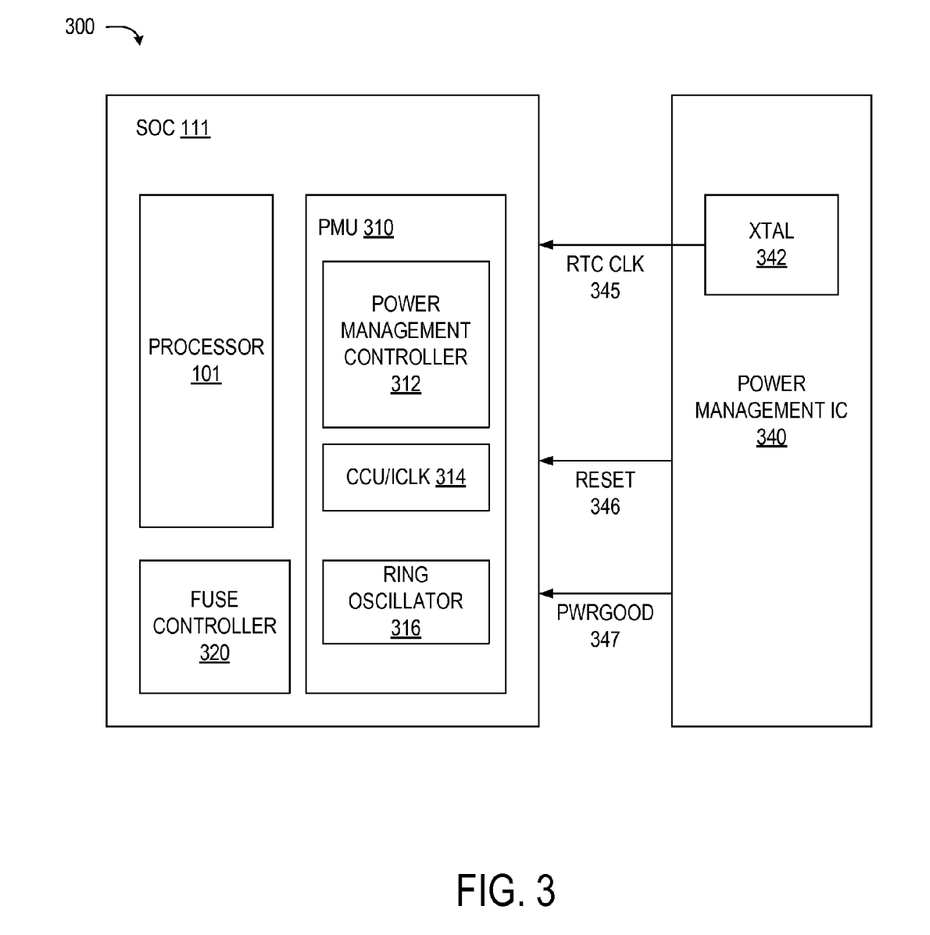
FIG. 3 illustrates a block diagram of a system reset sequence.

Referring to FIG. 3, an embodiment of a system on chip controlled reset performed by a power management IC. Embodiment 300 depicts SoC 111 and power management IC (PMIC) 340. SoC 111 includes processor 101, fuse controller 320 and power management unit 310. Fuse controller 320 is used to monitor serial analog fuses. Power management unit (PMU) 310 includes an internal clock CCU/ICLK 314, a ring oscillator 316, and a power management controller 312, used to create a reset sequence capable of clearing contention, downloading serial fuses and enabling system controllers to start running firmware. PMIC 340 is used by SoC 111 for managing power requirements of the system and may include XTAL 342. PMIC 340 provides an initial reset signal 346 before asserting a PWRGOOD signal 347 to SOC 111 to indicate the beginning of a ring oscillator calibration sequence. The real time clock (RTC) signal 345 is also provided via the XTAL 342.

Figure 4:
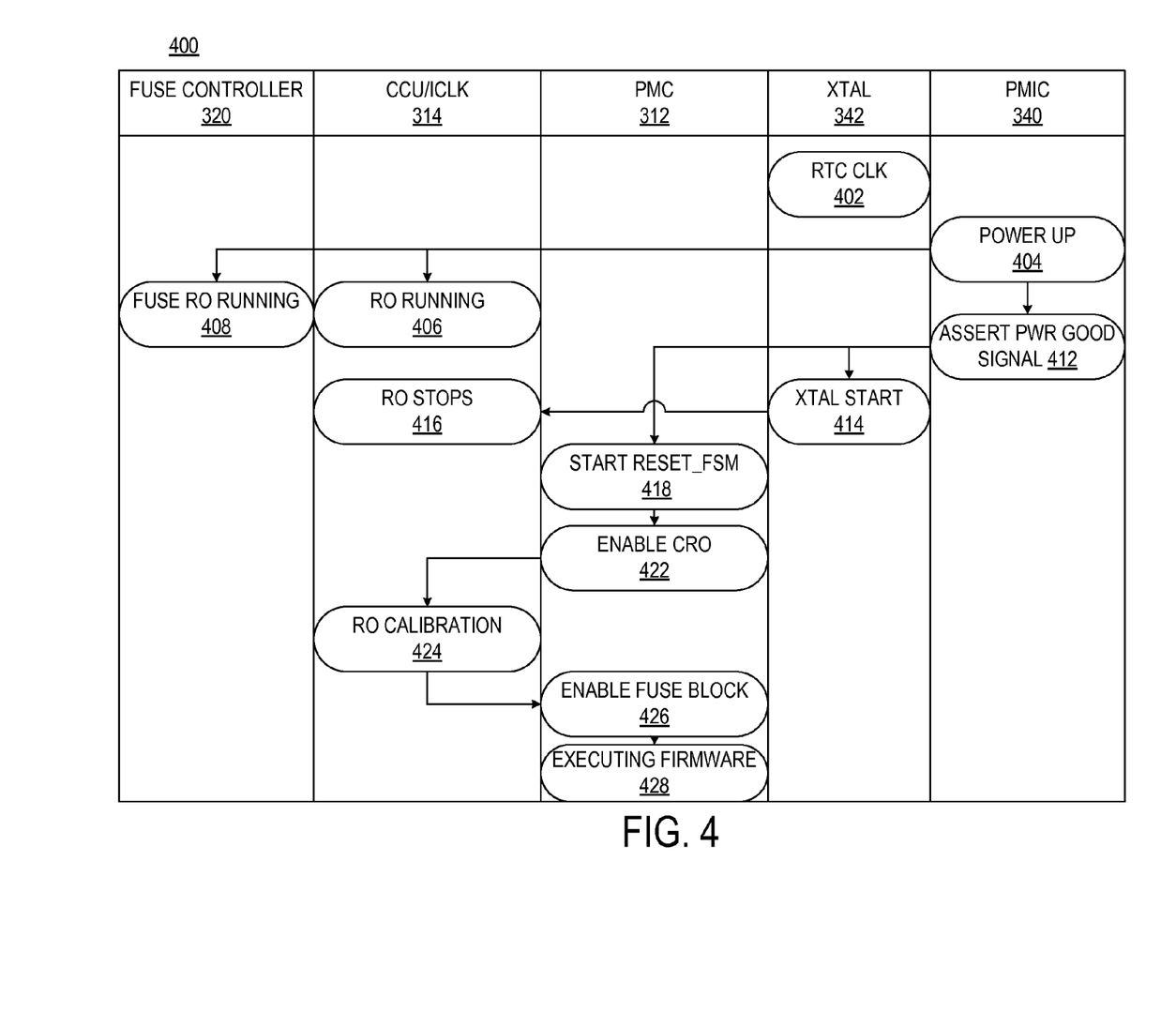
FIG. 4 illustrates one embodiment of a flow of a ring oscillator calibration.

Referring now to FIG. 4, an embodiment of a sequence of booting a system by using a ring oscillator. Embodiment 400 depicts the booting sequence. Reference clock RTC 402, in XTAL 342, is used to calibrate the ring oscillator at a target frequency. PMIC 340, a slave device controlled by the SoC, detects a good battery and sends a power up 404 signal to run the ring oscillator (RO) 406 in CCU/ICLK 314 and the serial fuse RO 408 in fuse controller 320. PMIC 340 then asserts a power good signal 412 and the signal is sent to XTAL start 414 in the XTAL 342 block and to start reset of a finite state machine (reset_fsm) 418 in PMC 312. XTAL start 414 signals the RO to stop running 416.

Once the reset_fsm start 418 signals the enabling of the RO calibration signal 422 in PMC 312, the RO calibration 424 begins in CCU/ICLK 314. Once calibration is performed on the RO, the fuse block is enabled 426 by PMC 312 and indication is given to proceed with executing firmware 428 by PMC 312.

Figure 5:
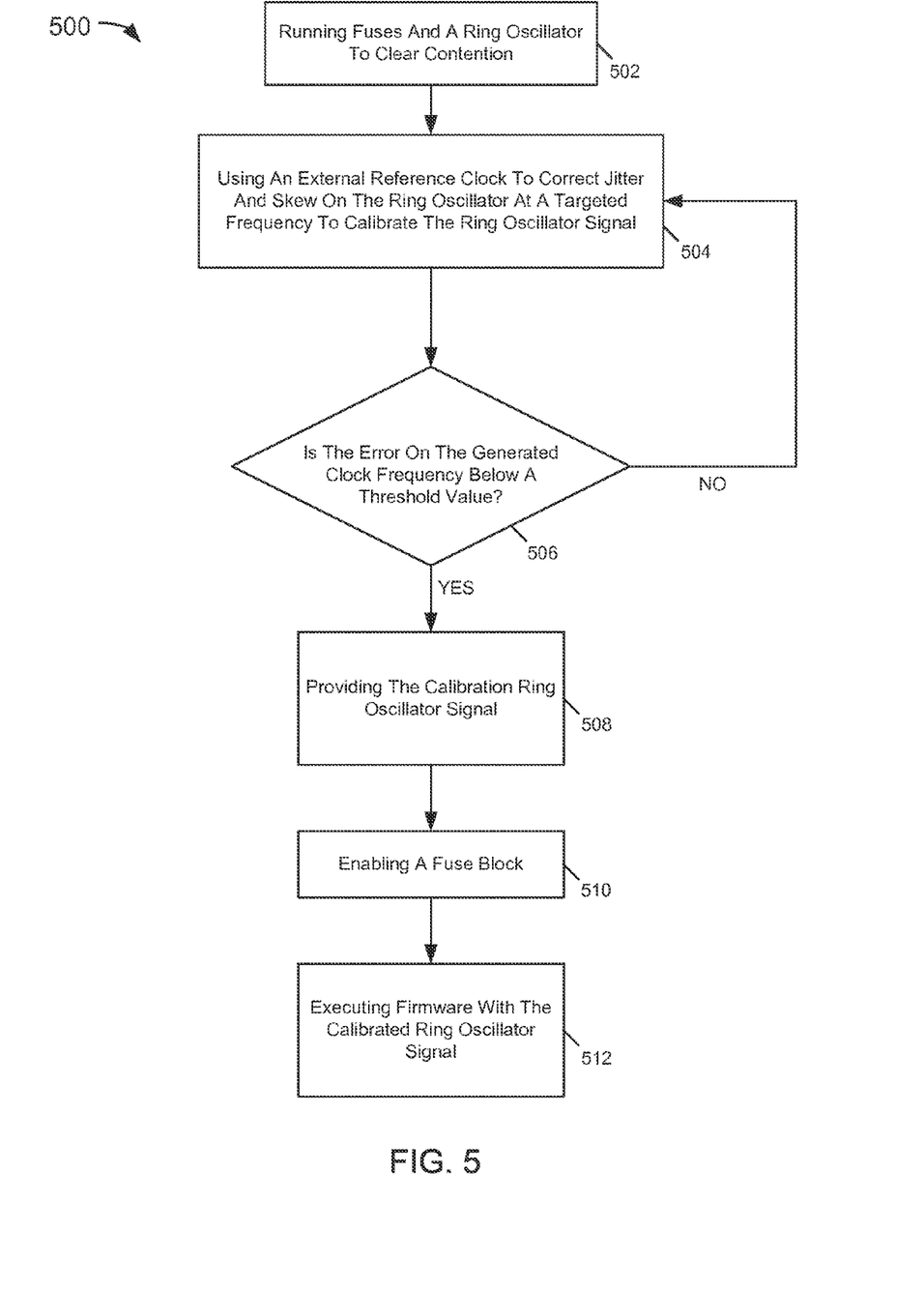
FIG. 5 illustrates one embodiment of a method of providing a controlled reset sequence.

Referring now to FIG. 5, one embodiment of a method of providing a controlled reset sequence. Embodiment 500 of a method to provide a controlled reset sequence begins with running serial fuse and a ring oscillator to clear contention in block 502. In order to ensure proper operation for all controllers on the system, a calibrated version of the ring oscillator is needed. To calibrate the ring oscillator, an external reference clock is used to correct jitter and skew on the ring oscillator at a targeted frequency 504. Next determination is made in decision block 506 to see if the error on the generated clock frequency is below a threshold value. If the error is not below the threshold value, the flow returns to 504 to use the external reference clock to correct jitter and skew on the ring oscillator again. If determination is made that the error on the generated clock frequency is below a threshold value, the calibrated ring oscillator calibration signal is enabled provided 508 and a fuse block is enabled 510. The method flow continues to proceed with executing firmware 512.

Figure 6A:
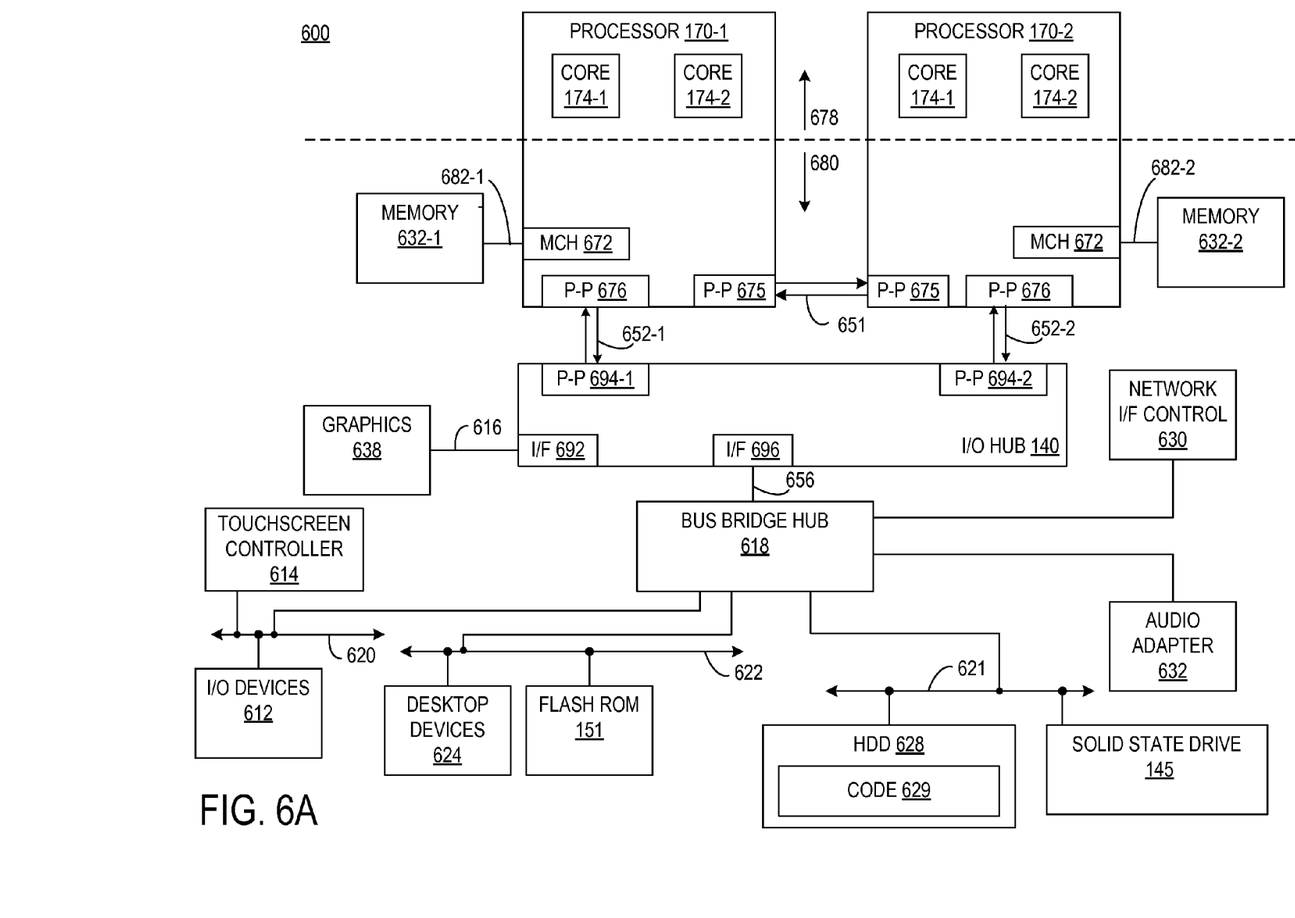
FIGS. 6A & 6B illustrates a system for use in conjunction with at least one embodiment.

Embodiments may be implemented in many different system types and platforms. Referring now to FIG. 6A, an illustrated embodiment of system 600 is a multi-processor system that includes a first processor 170-1 and a second processor 170-2. Although FIG. 6A illustrates two processors 170, other embodiments may include more or fewer processors. The illustrated embodiment of processors 170 includes a core region 678 and an integration region 680. Core region 678 includes one or more processing cores 174, while the illustrated embodiment of integration region 680 includes a memory controller hub (MCH) 672, a processor-hub point-to-point interface 676, and a processor-processor point-to-point interface 675.

Processing cores 174 may each include hardware and firmware resources (not depicted) to support an execution pipeline. These resources may include, in some embodiments, a cache memory hierarchy, which may include a dedicated L1 instruction cache, a dedicated L1 data cache, an L2 data/instruction cache, or a combination thereof, pre-fetch logic and buffers, branch prediction logic, decode logic, a register file, various parallel execution resources including arithmetic logic units, floating point units, load/store units, address generation units, a data cache, and so forth.

In the illustrated embodiment in FIG. 6A, MCH 672 supports bidirectional transfer of data between a processor 170 and a system memory 632 via a memory interconnection 682. System memory 632 may be a double-data rate (DDR) type dynamic random-access memory (DRAM) while memory interconnection 682 and MCH 672 may comply with a DDR interface specification. System memory 632 may represent a bank of memory interfaces (or slots) that may be populated with corresponding memory circuits for a desired DRAM capacity.

In the multi-processor system 600, each processor 170 includes an MCH 672 to communicate with a portion of system memory 632 that is local to processor 170. In some embodiments, system memory 632-1 is local to processor 170-1 and represents a portion of the system memory 632 as a whole. In the illustrated embodiment, system 600 is a distributed memory multiprocessor system in which each processor 170 can access each portion of system memory 632, whether local or not. While local accesses may have lower latency, accesses to non-local portions of system memory 632 are permitted.

In FIG. 6A, each processor 170 also includes a point-to-point interface 675 that supports communication of information with a point-to-point interface 675 of one of the other processors 170 via an inter-processor point-to-point interconnection 651. In some embodiments, processor-hub point-to-point interconnections 652 and processor-processor point-to-point interconnections 651 are distinct instances of a common set of interconnections. In other embodiments, point-to-point interconnections 652 may differ from point-to-point interconnections 651.

In some embodiments, processors 170 include point-to-point interfaces 676 to communicate via point-to-point interconnections 652 with a point-to-point interface 694 of an I/O hub 140. In the illustrated embodiment, I/O hub 140 includes a graphics interface 692 to support bidirectional communication of data with a graphics adapter 638 via a graphics interconnection 616, which may be implemented as a high speed serial bus, e.g., a peripheral components interface express (PCIe) bus or another suitable bus.

The illustrated embodiment of I/O hub 140 also communicates, via an interface 696 and a corresponding interconnection 656, with a bus bridge hub 618 that supports various bus protocols for different types of I/O devices or peripheral devices. The illustrated embodiment of bus bridge hub 618 supports a network interface controller (NIC) 630 that implements a packet-switched network communication protocol (e.g., Gigabit Ethernet), a sound card or audio adapter 632, and a low bandwidth bus 622 (e.g., low pin count (LPC), I2C, Industry Standard Architecture (ISA)) to support legacy interfaces referred to herein as desktop devices 624 that might include interfaces for a keyboard, mouse, serial port, parallel port, and a removable media drive, and may further include an interface for a nonvolatile memory (NVM) device such as flash ROM 151. The illustrated embodiment of low bandwidth bus 620 supports other low bandwidth I/O devices 612 (e.g., keyboard, mouse) and touchscreen controller 614. Storage protocol bus 621 (e.g., serial AT attachment (SATA), small computer system interface (SCSI)) supports persistent storage devices including conventional magnetic core hard disk drives (HDD) 628. HDD 628 is illustrated as including code 629, which may represent processor executable instructions including operating system instructions, application program instructions, and so forth, that, when executed by the processor, cause the processor to perform operations described herein.

The illustrated embodiment of system 600 also includes an "HDD-like" semiconductor-based storage resource referred to as solid state drive (SDD) 145, and a general purpose serial communication bus 620 (e.g., USB, PCI, PCIe) to support various devices. Although specific instances of communication busses and bus targets have been illustrated and described, other embodiments may employ different communication busses and different target devices.

Figure 6B:
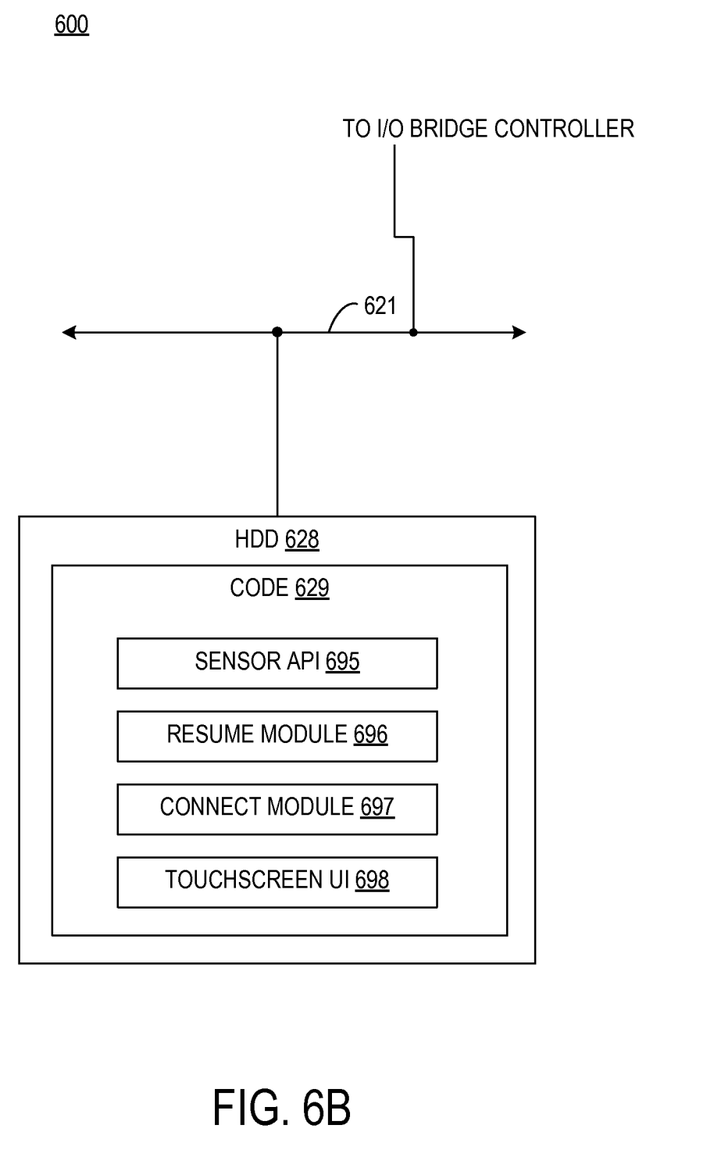

In FIG. 6B, HDD 628 is illustrated as including code 629, which may represent processor executable instructions including operating system instructions, application program instructions, and so forth, that, when executed by the processor, cause the processor to perform operations described herein. HDD 628 uses storage protocol bus 621 as an interface with bus bridge hub 618.

In FIG. 6B, code 629 may also include a sensor application programming interface (API) 695 which provides application program access to one or more sensors (not depicted) that may be included in system 600. Sensors that system 600 might have in some embodiments include an accelerometer, a global positioning system (GPS) device, a gyro meter, an inclinometer, and a light sensor. Resume module 696 may be implemented as software that, when executed, performs operations for reducing latency when transitioning system 600 from a power conservation state to an operating state. Resume module 696 may work in conjunction with solid state drive (SSD) 145 to reduce the amount of SSD storage required responsive to system 600 entering a power conservation mode. Resume module 696 may, in some embodiments, flush standby and temporary memory pages before transitioning to a sleep mode. By reducing the amount of system memory space that system 600 is required to preserve upon entering a low power state, resume module 696 beneficially reduces the amount of time required to perform the transition from the low power state to an operating state. Connect module 697 may include software instructions that, when executed, perform complementary functions for conserving power while reducing the amount of latency or delay associated with traditional "wake up" sequences. In some embodiments, connect module 697 may periodically update certain "dynamic" applications including email and social network applications, so that, when system 600 wakes from a low power mode, the applications that are often most likely to require refreshing are up to date. In the illustrated embodiment, the inclusion of touchscreen support 698 in conjunction with support for communication devices enable system 600 to provide features traditionally found in dedicated tablet devices as well as features found in dedicated laptop and desktop type systems.

Figure 7:
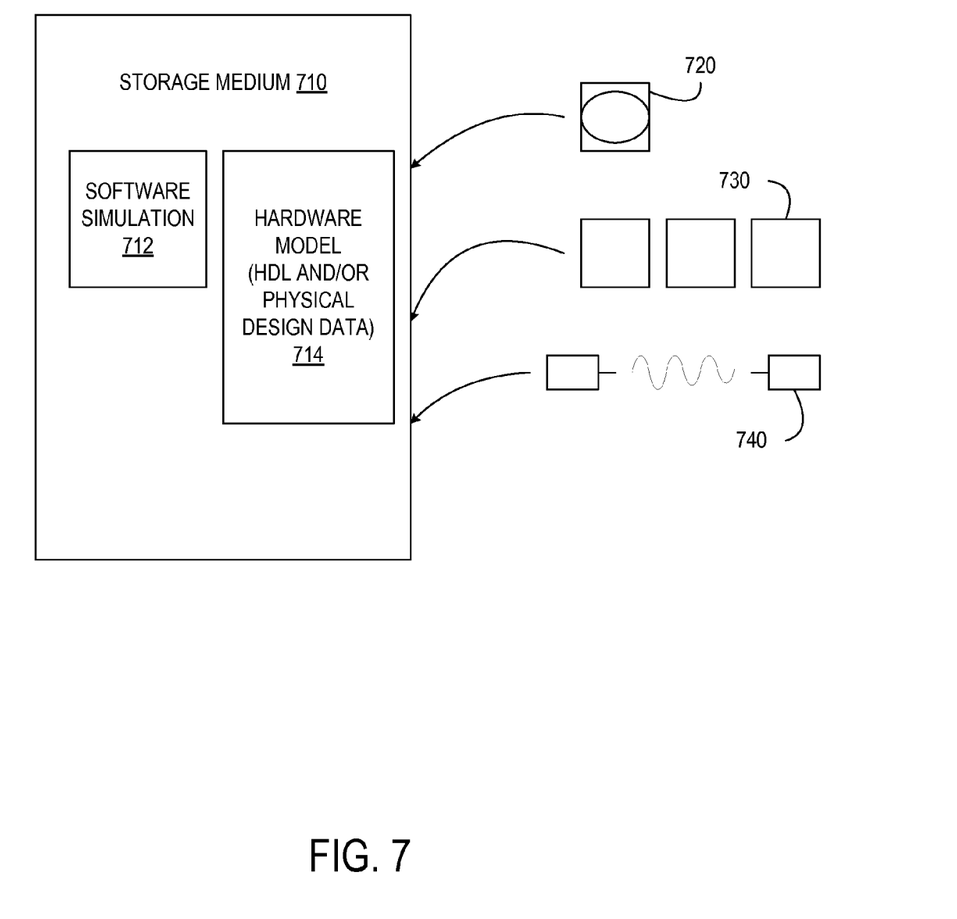
FIG. 7 illustrates a representation for simulation, emulation and fabrication of a design implementing the disclosed techniques.

Referring now to FIG. 7, a representation for simulation, emulation and fabrication of a design implementing the disclosed techniques is illustrated. Data representing a design may represent the design in a number of manners. First, as is useful in simulations, the hardware may be represented using a hardware description language or another functional description language which basically provides a computerized model of how the designed hardware is expected to perform. The hardware model 714 may be stored in a storage medium 710 such as a computer memory so that the model may be simulated using simulation software 712 that applies a particular test suite to the hardware model 714 to determine if it indeed functions as intended. In some embodiments, the simulation software 712 is not recorded, captured or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, reconfigurable hardware is another embodiment that may involve a tangible machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. An optical or electrical wave 740 modulated or otherwise generated to transmit such information, a memory 730, or a magnetic or optical storage 720 such as a disc may be the tangible machine readable medium. Any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method comprising:
    initiating a ring oscillator of a processor responsive to receiving a power up signal from a power management integrated circuit coupled to the processor;
    generating a calibrated ring oscillator signal by calibrating a frequency of a ring oscillator signal with a reference clock signal;
    responsive to detecting a calibrated ring oscillator signal error below a threshold value:
        providing the calibrated ring oscillator signal to a firmware module of the processor to execute firmware.

2. The method of claim 1, wherein the reference clock signal is the only clock source.

3. The method of claim 1, wherein a jitter of the calibrated ring oscillator signal is less than a jitter threshold, wherein the jitter threshold is in the range of approximately 5 to 10%.

4. The method of claim 1, wherein a skew of the calibrated ring oscillator signal is less than a skew threshold, wherein the skew threshold is in the range of approximately 5 to 10%.

5. The method of claim 1, further comprising: establishing a first phase locked loop (PLL) after executing the firmware.

6. The method of claim 1, wherein calibrating the ring oscillator signal initiates responsive to receiving an assert power good signal from the power management integrated circuit.

7. The method of claim 1, wherein calibrating the ring oscillator signal includes correcting ring oscillator signal jitter and skew at a targeted frequency.

8. The method of claim 1, wherein calibrating the ring oscillator signal includes counting a number of ring oscillator signals during a calibration interval determined by the reference clock signal.

9. A computer system, comprising:
    a power management integrated circuit; and
    a system-on-chip, comprising:
        a processor;
        a fuse controller; and
        a power management unit, comprising;
            a ring oscillator; and
            a power management controller to:
                initiate the ring oscillator responsive to receipt of a power up signal from the power management integrated circuit;
                generate a calibrated ring oscillator signal by calibration of a frequency of a ring oscillator signal with a reference clock signal;
                responsive to detection of a calibrated ring oscillator signal error below a threshold value:
                provide the calibrated ring oscillator signal to a firmware module of the system-on-chip to execute firmware.

10. The system of claim 9, wherein the reference clock signal is the only clock source.

11. The system of claim 9, wherein the power management unit is to establish a first phase locked loop (PLL) after the firmware is executed.

12. The system of claim 9, wherein the power management unit is to calibrate the ring oscillator signal responsive to receipt of an assert power good signal from the power management integrated circuit.

13. A system-on-chip, comprising:
    a processor;
    a fuse controller; and
    a power management unit, comprising;
        a ring oscillator; and
        a power management controller to:
            initiate the ring oscillator responsive to receipt of a power up signal from a power management integrated circuit;
            generate a calibrated ring oscillator signal by calibration of a frequency of a ring oscillator signal with a reference clock signal;
            responsive to detection of a calibrated ring oscillator signal error below a threshold value:
            provide the calibrated ring oscillator signal to a firmware module of the system-on-chip to execute firmware.

14. The system-on-chip of claim 13, wherein the power management controller is to calibrate the ring oscillator responsive to receipt of an assert power good signal from the power management integrated circuit.

15. The method of claim 1, further comprising using the ring oscillator during a booting sequence of the processor, comprising:
    running a first ring oscillator in a clock control unit of the processor; and
    running a second ring oscillator in a fuse controller of the processor.

16. The method of claim 1, further comprising responsive to detecting the calibrated ring oscillator signal error below the threshold value, enabling a fuse block to download fuses.

17. The system of claim 9, wherein the system-on-chip is to use the ring oscillator during a booting sequence to:
- run a first ring oscillator in a clock control unit of the system-on-chip; and
- run a second ring oscillator in the fuse controller of the system-on-chip.

18. The system-on-chip of claim 13, wherein the system-on-chip is to use the ring oscillator during a booting sequence to:
- run a first ring oscillator in a clock control unit of the system-on-chip; and
- run a second ring oscillator in the fuse controller of the system-on-chip.

19. The system-on-chip of claim 13, wherein the system-on-chip is to enable a fuse block to download fuses, responsive to detection of the calibrated ring oscillator signal error below the threshold value.

\* \* \* \* \*